Oct. 19, 1965 R. P. BENNETT 3,212,211
INSECTICIDAL APPLICATION DEVICE
Filed June 21, 1963 3 Sheets-Sheet 1
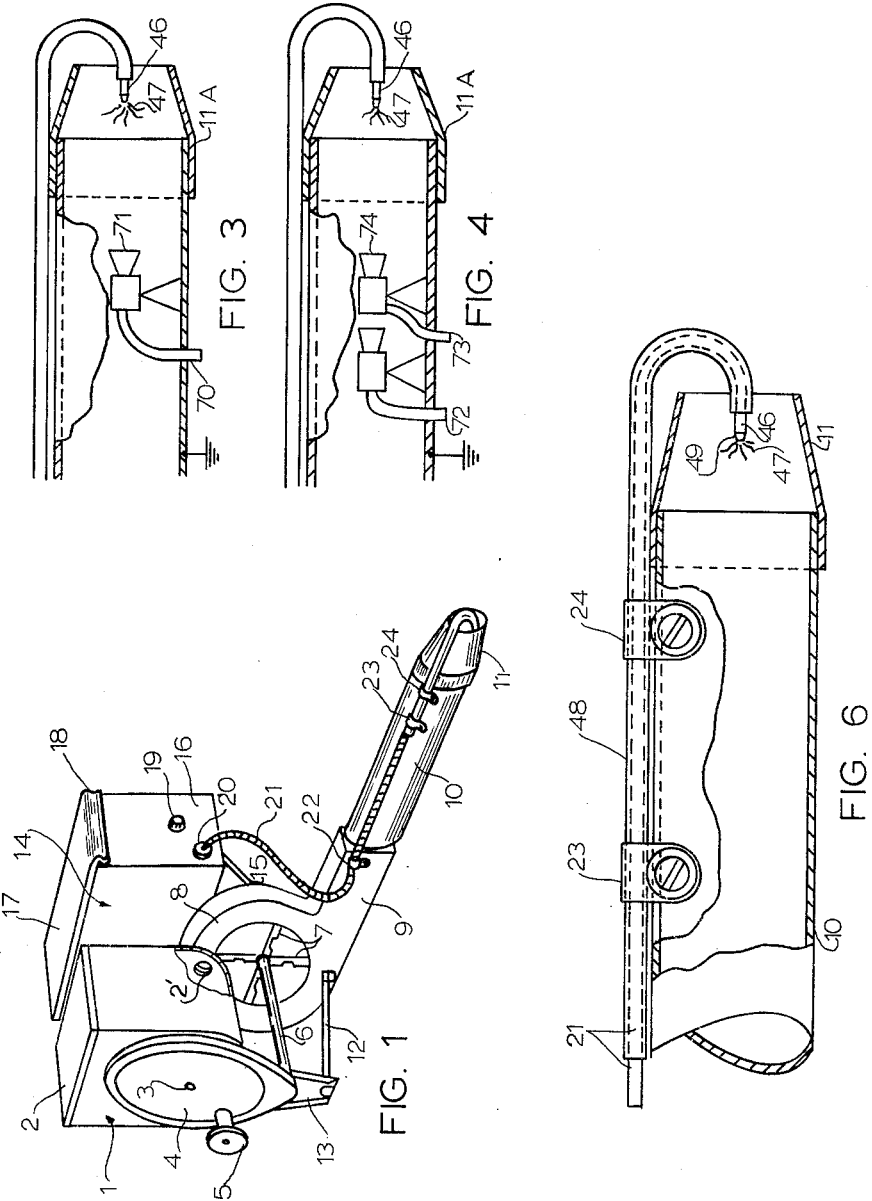
Robert P. Bennett
*INVENTOR.*
BY *John J. Miller*
ATTORNEY Oct. 19, 1965     R. P. BENNETT     3,212,211
INSECTICIDAL APPLICATION DEVICE
Filed June 21, 1963     3 Sheets-Sheet 2
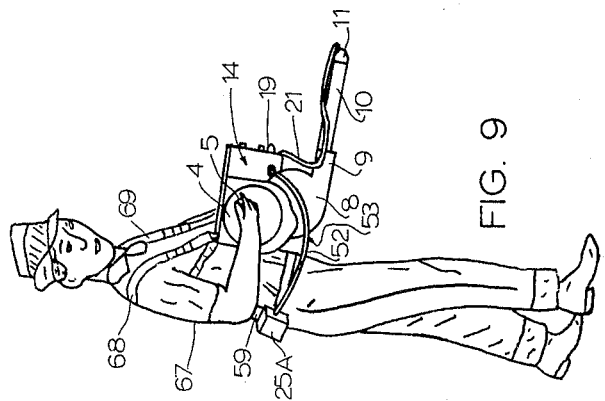
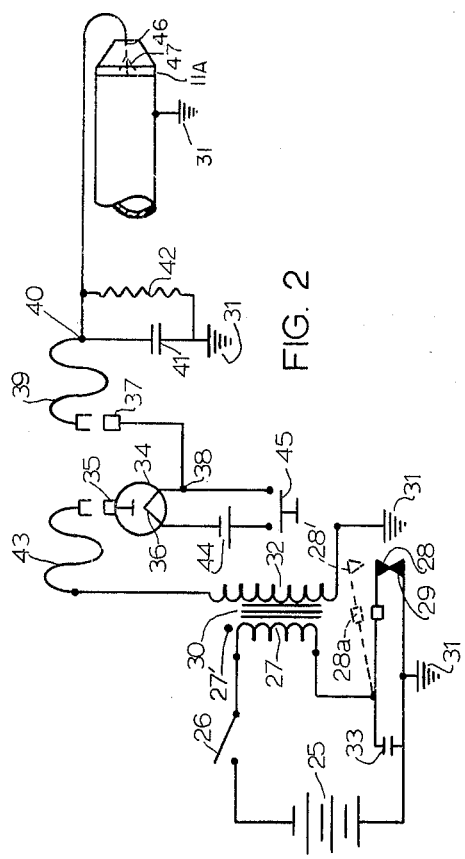
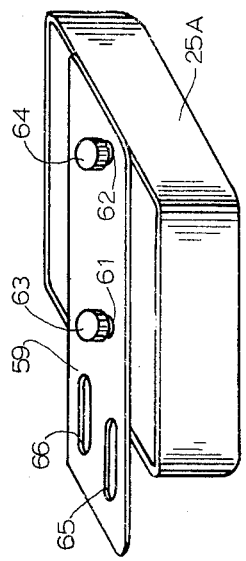
Robert P. Bennett
*INVENTOR.*
BY
ATTORNEY

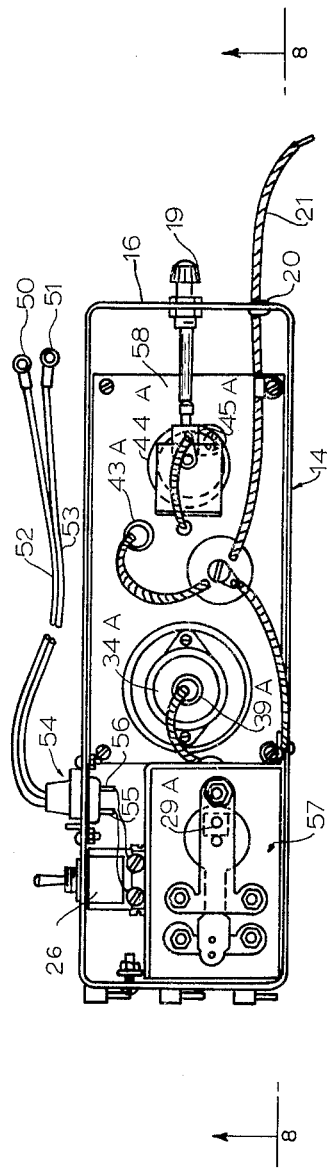
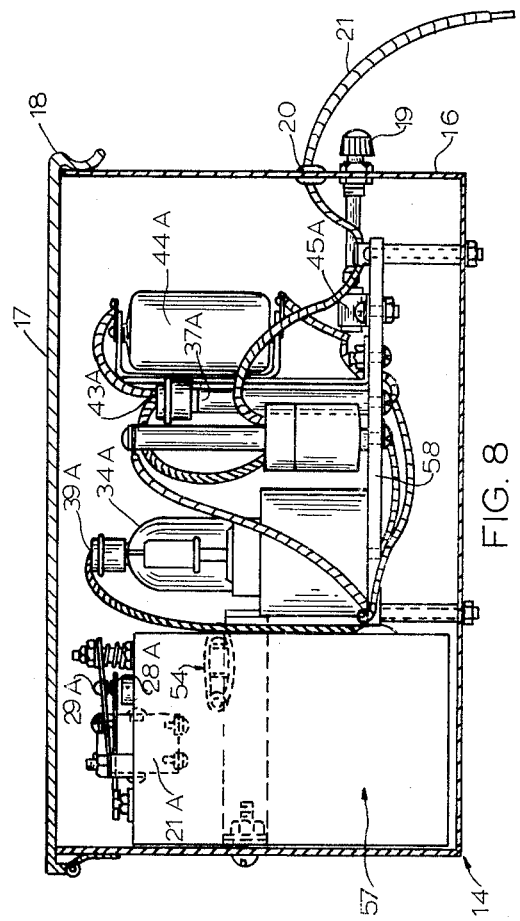

United States Patent Office 3,212,211
Patented Oct. 19, 1965

3,212,211
INSECTICIDAL APPLICATION DEVICE
Robert P. Bennett, Raleigh, N.C., assignor, by mesne assignments, of two-ninths each to Martha W. Chapman, Robert E. Ward, Jr., and William S. Ward, all of Raleigh, N.C.
Filed June 21, 1963, Ser. No. 289,682
9 Claims. (Cl. 43—148)

This invention relates to agricultural implements and more particularly to devices used in the application of insecticides and similar materials to various types of vegetation.

The application of insecticides to various types of vegetation for pest control is not new. Also, the introduction of electrical current into the stream of insecticide particles as such particles pass through the nozzle into the atmosphere thereby creating an electrostatic field is not new. There have been problems, however, in the development of a reliable and yet light-weight power supply which may be used in conjunction with hand portable dusting and spraying units so that the advantages of electrostatically charged particles may be realized in the use of such hand devices.

After extensive experimentation in the laboratory as well as field tests a power supply has been developed which is simple and rugged and yet meets the exacting requirements for portability, lightness in weight, high voltage, and safety for the operator while also incorporating the feature of reversible polarity which has been found absolutely necessary in reliable operation of this type of device, but which has not been fully appreciated heretofore.

Since most of the work done in the electrostatic dusting and spraying field has been concentrated on large agricultural implements for application on large areas such as fields and even though there has been a need for a hand distributing device of the electrostatic type to be used by greenhouse operators, flower and vegetable gardners and similar people, no device has been available prior to the present invention which completely meets the need of these people and yet gives all of the advantages of the larger units.

It is noted that in standard application of insecticidal particles for agricultural purposes, on the average less than 20 percent of the material actually reaches the plants that the material is intended to reach, the rest being drifted away by air currents or contacting the earth of other areas upon which such material is not intended. By passing the dust or spray through an electrostatic field prior to its ejection from the charging nozzle a theoretical coverage increase of 8 to 10 times is possible or inversely the same coverage may be obtained by reducing the amount of material used by 8 to 10 times. In actual field trials conducted by State Experimental Stations a coverage increase of 6 times the number of particles per square millimeter was found by a particle count between the non-charged dust and the charged dust in the same environmental situation.

It is therefore an object of the present invention to provide a hand portable particle distributing device in combination with an electrostatic charging mechanism to provide the advantages of electrostatically charged particles with the needs of people who use small distributing units.

Another object of the present invention is to provide a power supply which is rugged and yet simple and light-weight enough to lend itself to portability while producing the high voltage needed to place a charge on the particles passing through the discharge nozzle.

Another object of the present invention is to provide a power supply for a portable distributing unit which will automatically open the circuit and thereby shut the high voltage off from the nozzle upon the operator being injured or in any way stricken, or upon cessation of the distributing operation.

Another object of the present invention is to provide a cluster of electrodes in the discharge nozzle of the device to give more complete and uniform charging of the particles as they pass from such nozzle.

Another object of the present invention is to provide a carrier for the battery which supplies power to the electrostatic unit operating in conjunction with the portable distribution device.

Other objects and advantages of the present invention will become apparent and obvious from a study of the following description and the accompanying drawings which are merely illustrative of the present invention:

In the drawings:

FIG. 1 is a perspective of a portable particle distributing device incorporating the electrostatic unit of the present invention;

FIG. 2 is a schematic wiring diagram of the improved power supply of the present invention;

FIG. 3 is a schematic drawing of a modified discharge nozzle adapted to be used in conjunction with a pressure spray;

FIG. 4 is a schematic drawing of a discharge nozzle to be used in conjunction with air and liquid materials;

FIG. 5 is a perspective of the primary battery which operates the power supply;

FIG. 6 is an enlarged sectional view of the nozzle portion of the unit disclosed in FIG. 1 showing the cluster of electrodes in the discharge portion of said nozzle;

FIG. 7 is a top elevational view of the power supply with the top of such supply removed;

FIG. 8 is a cutaway side elevation of lines 8—8 of FIG. 7; and

FIG. 9 shows the portable electrostatic distributing device in operative position.

With further reference to the drawings, FIG. 1 discloses an insecticidal dusting device incorporating the present invention. There is provided a hopper 1 for storing and dispensing the insecticidal or other type of dust being disbursed by the device. There is a removable cover 2 placed over the upper portion of the hopper 1 to prevent contamination of the materials within said hopper and also to prevent spilling and other loss of such materials.

Rotatably mounted about a shaft 3 is a pulley or gear 4 which has a rotatably mounted handle 5 mounted thereon. A power shaft 6 is mounted in operative relation with the pulley or gear 4 in such a manner that any rotative motion imparted to said pulley or gear will be transmitted to said power shaft. Fixedly mounted on the opposite end of the power shaft 6 from the pulley 4 are impeller blades 7 which force the dust which is fed thereto from the hopper 1 through passageway 2' into the impeller housing 8 through the housing extension 9 the hose 10 and out the nozzle tip 11.

Fixidly connected to the side of the impeller housing 8 is a support member 12 whose opposite end is connected to a downwardly projecting bearing support 13 which rotatably mounts the power shaft 6. The upper end of the bearing support is fixedly connected to the lower portion of the hopper.

Fixedly attached to the hopper and the impeller housing is a power supply housing 14 having a support bracket 15 fixedly connected at one end to the lower portion of the power supply housing and at the other end to the impeller housing on generally the opposite side from the support member 12.

The power supply housing indicated generally at 14 has a front wall portion 16 and a removable top portion 17. A spring latch mechanism of a common type indicated generally at 18 is provided to secure the top portion 17 in fixed relation to the housing 14.

Operatively mounted on the front wall portion 16 of the power supply housing is a serrated knob or button 19 for activating the pressure contact switch hereinafter described. An insulating grommet 20 is also provided in the front wall portion of the power supply housing through which passes an insulated power transmission cable 21. Cable brackets 22, 23 and 24 are spaced along the said transmission cable to secure the same in fixed relation to the impeller housing extension and hose.

Referring to the schematic wiring diagram of the power supply disclosed in FIG. 2, there is particularly shown a vibratory type high voltage direct current supply source having means by which the electrode which ultimately controls the electrical charge placed on the particles may have its polarity made positive or negative with reference to ground depending on which charge gives the best results under the prevailing atmospheric conditions.

The battery 25 is connected in series with a suitable switch 26, a primary winding 27 of relatively heavy and few turns and a pair of contacts 28 and 29. The contact 28 is a movable contact and is arranged in such a manner that by reason of its associated armature 28a will move toward the core 30 as indicated in dashed lines by reference numeral 28' whenever said core is magnetized by current flowing in primary 27 and will return to fixed contact 29 when said core 30 is not magnetized. While the polarity may be reversed from that shown, it will be noted that in the schematic the negative side of the battery 25 is connected to the dotted side 27' of primary 27 and the positive side of the battery 25 is grounded to the reference ground 31.

In accordance to the well known vibrator induction coil action, whenever switch 26 is closed, a current will tend to flow in primary 27 and through contacts 28 and 29 until the core 30 breaks the circuit. The field around primary 27 then collapses and produces a relatively high voltage in the secondary winding 32 which comprises a relatively large number of fine turns. Arcing across the contacts 28 and 29 is reduced by the capacitor 33 which also makes the breaking of the circuit more sudden and the restoring of the circuit more gradual. With the switch 26 remaining closed the action described is automatic and substantially continuous and a pulsating relatively high, voltage appears in the secondary 32.

The secondary 32 is coupled to a rectifier tube 34 having an anode 35 and a heated cathode 36. A suitable terminal 37 is mounted externally of the rectifier tube 34 and is connected to the cathode 36 at the junction 38. A flexible and easily removable lead 39 is connected to a junction 40 on one side of a filter and smoothing network comprising a capacitor 41 and resistor 42. A second easily removable lead 43 is used to couple the secondary 32 to the rectifier tube 34. The leads 39 and 43 may thus be interchanged in making connection either to the anode 35 or the cathode connected terminal 37 thereby enabling junction 40 to have either positive or negative polarity depending on the results desired. By being able to reverse the power supply in this manner, the polarity of the potential applied to the dust or other material may be made positive or negative depending on the dictates of atmospheric conditions or material composition of the material being distributed.

In the interest of safety it is desirable that the rectifying action of the tube 34 be controlled in order to block transmission of the high voltage developed in the secondary 32. To accomplish this control the cathode heater voltage source 44 is arranged in series with a manually operated, normally off push button pressure switch 45. In other words, the cathode heater circuit is normally open and is completed only during the time that the pressure switch 45 is held in depressed position by the operator of the overall device. Thus even though the switch 26 remains closed and the battery 25 is operative, the rectifier 34 will conduct only when the switch 45 is depressed by the operator and such conduction will immediately cease upon release of pressure on said switch.

Considering the nozzle 11a as an electrode grounded through the reference ground 31, the second electrode comprises a terminal 46 mounted centrally within the said nozzle 11a. Said terminal 46 has a number of small diameter electrically conducting wires 47 fixed thereto. The terminal 46 is connected to junction 40 so that said terminal carries the potential and polarity developed at such junction. Fine copper or other conducting strands are considered ideal to be fixed to terminal 46, the purpose being to maximize the field strength in the immediate vicinity of terminal 46 so as to create a strong electrical or corona type of discharge of predetermined direction of current flow between the two electrodes.

When the leads 39 and 43 are connected so as to make terminal 46 positive, electrons are removed from the particles so as to leave them positive whereas when the leads 39 and 43 are shifted to make the terminal 46 negative, electrons are added to the particles to leave them negative.

FIG. 3 is a schematic drawing of a further embodiment of the present invention wherein an atomizing orifice 71 is adjustably mounted in the air stream passing through the nozzle 11a whereby when a liquid type of insecticide under pressure passes through tube 70 and out orifice 71 into said air stream the spray particles will be charged by the corona effect of conducting wires 47 of the terminal 46.

FIG. 4 discloses a schematic drawing of a modified nozzle similar to that of FIG. 8 except that an air tube 72 is provided in series with liquid tube 73 wherein atomized particles will pass from atomizing orifice 74 into the air stream to be charged according to the polarity of the conducting wires 47 of the terminal 46.

FIG. 6 is an exploded sectional view of the nozzle shown in FIG. 1. The power transmission cable 21 is shown held in fixed relation to the hose 10 by cable brackets 23 and 24. The power transmission cable 21 is incased in a sleeve 48 formed of any suitable electrical insulating material. The electrode terminal 46 has a tip portion 49 secured thereto which retains the conducting wires 47 (which may be said to have corona points at the unattached end thereof) in proper fixed position.

Since the electrode nozzle 11 is generally frustoconical in shape, the terminal electrode 46 must be placed centrally within said nozzle to obtain the best results during the operation of the device. It has also been found that by placing the terminal 46 outboard of the nozzle 11 and curving the same around the end of and into said nozzle in a general hook shape so that the conducting wires 47 are in proper location, much better operation of the device may be had.

To obtain the proper potential between the terminal electrode 46 and the nozzle electrode 11 the hose 10 must be composed of a conductive material so that the reference ground of said nozzle may be realized. If desirable, of course, other means may be used to insure that the nozzle 11 is at the same potential as the reference ground 31 of the power supply.

FIGS. 7 and 8 disclose one arrangement of the various parts of the power supply within the power supply housing 14. Battery terminal connections 50 and 51 are secured to battery leads 52 and 53 respectively. A terminal board 54 is mounted on the power supply housing 14. Internally projecting terminals 55 and 56 are provided which connect the terminal boards 54 with the switch 26 by means of any suitable conductive material. The primary winding, armature and secondary winding are all incased within the housing designated generally as 57.

The contacts 28a and 29a form a vibrator which is mounted on top of the housing 57.

The rectifier tube 34a is mounted forward of the housing 57. Swing lead 39a is removably mounted on the rectifier tube 34a. The swing lead 43a is removably mounted on the terminal 37a. The cathode heater voltage source 44a is mounted in the forward portion of the power supply housing 14.

Pressure switch 45a and related parts are also located in the forward portion of the power supply housing 14. The serrated knob or button 19 wihch operates the pressure switch 45a is located on the outside of said power supply housing 14. The power transmission cable 21 passes through the insulating grommet 20 mounted on the forward wall 16 of the power supply housing 14. Also secured to the front wall portion 16 is a latch means indicated generally at 18 for releasably securing the top portion 17 to the power supply housing 14.

Several of the various components of the power supply are mounted within the power supply housing 14 on an insulated nonconductive platform 58.

The primary source of energy for the power supply is obtained from a battery such as that disclosed in FIG. 5. For convenience and portability, a generally flat rectangular support plate 59 is provided which is formed of an electrically insulating material. A battery 25a having positive and negative terminals 61 and 62 is provided as a well known and readily available source of energy. To make the battery portable all that is necessary is to remove the terminal caps 63 and 64, place the support plate which contains openings in longitudinal alignment corresponding to the spaced relation of the terminals, over the terminals and then replaces the terminal caps to secure the support plate and battery in removably fixed position. In one end of the support plate there are two parallel longitudinally disposed slots 65 and 66 through which the belt of the operator of the dusting device may be threaded thereby providing a support for the battery 60.

In the operating of one embodiment of the present invention an operator 67 (FIG. 9) of the device places straps 68 and 69 over his shoulders, said straps being fastened in any convenient manner to the distributing device. Next the operator secures the support plate 59 to the terminal 61 and 62. He also secures the battery leads 50 and 51 to the battery terminals 61 and 62. Next the operator threads his belt through the slots 65 and 66 thereby providing a support for the battery 25a. Next the operator throws the switch 26 to energize the power supply up to the rectifier tube 34. The operator may now start the dusting (or spraying depending on the material being used) process by turning the handle 5 in a rotary motion thereby feeding dust into the impeller housing whereby the rotating impeller blades will force it through the hose 10 and out the nozzle 11. At the same time this operation is begun, the operator will depress the knob 19 on the forward wall 16 of the power supply housing thereby energizing the cathode heater which allows the rectifier tube 34 to become operative and high-voltage to pass to the terminal electrode 46 thereby setting up an electrostatic field as hereinbefore enumerated. So long as the operator 67 holds the pressure switch 45 in depressed position, a charge will be maintained in the nozzle of the device, but any relaxation of pressure on such switch will break the contact between the cathode heater voltage source and the cathode heater thereby not allowing any voltage to pass beyond the rectifier tube. In the operation of this device, of course other means of rotating the impeller blades may be substituted for the hand crank disclosed particularly in FIG. 1.

The present invention may be carried on in other specific ways than those herein set forth without departing from the spirit and essential characteristics of the invention. The present embodiments are therefore to be considered in all respects as illustrative and not restrictive and all changes coming within the meaning and equivalency range of the appended claims are intended to be embraced therein.

What is claimed is:

1. A self contained portable agricultural material distributing device comprising storage means for a particulate like material of fine texture, a blower for creating a moving air stream, means for disbursing said material into said stream, a generally frustoconical shaped nozzle of electrically conducting material connected to said blower and arranged so that said stream must pass there through, an electrode centrally disposed within and electrically insulated from said nozzle, said electrode including a plurality of relatively small electrically conducting wires protruding therefrom and capable of substantially increasing the field of intensity produced by said electrode, a battery, a power supply powered by said battery, said supply connected to said nozzle and said electrode, said supply being effective to place said electrode at a predetermined relatively high electrical potential and to produce a substantially continuous electrical discharge in a predetermined direction of current flow between said electrode and said nozzle whereby the particles of material leaving said nozzle assume an electrical charge of predetermined polarity, means for inverting the output of said supply thereby enabling the polarity of said potential to be controlled, and means for disconnecting the output of said supply from said electrode while maintaining said battery operative.

2. The power supply for an agricultural electrostatic particle distributing device comprising an electronic means for producing a pulsating voltage, said means including a source of D.C. current, a vibrator means and an induction coil type transformer means; a rectifying means; means of coupling said electronic means to said rectifying means; and a charging circuit connected to said rectifying means including a high-voltage electrode for placing a charge of predetermined polarity on particles passed within the corona effect of such electrode.

3. The device of claim 2 in which the rectifying means includes an electrical cathode heater means connected in series with a pressure switch for interrupting electrical current to said heater means, whereby said high voltage electrode may be rendered inoperative.

4. The device of claim 3 in which a means is provided to reverse the polarity of the voltage of said electrode.

5. The device of claim 4 in which the electrode has a multiplicity of relatively small diameter electrically conducting wires having tips adjustably fixed thereto, each of said wires being capable of producing a corona effect about the tip thereof, whereby the field of tensity produced by said electrode is substantially increased.

6. A self-contained, portable, agricultural material distributing device comprising: means for storing a material composed of relatively fine particles; means for creating a moving air stream; means for distributing said material into said stream; a tubular nozzle of electrically conductive material arranged about said stream; an electrode centrally mounted within said nozzle; a battery for producing a source of D.C. current; a vibratory type power supply; said supply including an electronic means for producing a pulsating voltage; said means including the battery as a source of D.C. current, a vibrator means and an induction coil type transformer means; a rectifying means; means of coupling said electronic means to said rectifying means and means of connecting said rectifying means to said electrode and nozzle whereby said supply is effective to produce a substantially continuous electrical corona discharge in a predetermined direction of current flow between said nozzle and said electrode thereby causing the particles of material leaving the nozzle to assume an electrical charge of a predetermined polarity.

7. A self contained portable agricultural material distributing device comprising means for storing a material composed of relatively fine particles, a blower, said blower being hand operated and capable of creating a moving air stream, means for disbursing said material into said stream, a tubular nozzle of electrically conducting material arranged about said stream, an electrode centrally mounted within said nozzle, a battery, a vibratory type power supply powered by said battery and connected to said electrode and nozzle, said supply including a rectifier having a normally open cathode heater circuit and a normally opened manual switch means to close said circuit whereby said electrode is rendered a harmless potential except when said switch means is closed, said supply being effective to produce a substantially continuous electrical corona discharge in a predetermined direction of current flow between said nozzle and said electrode and means for reversing said current flow to said electrode whereby control of the polarity of the material being discharged from the nozzle is accomplished.

8. The device of claim 1 in which the battery is provided with a pair of terminals, a pair of terminal covers, said terminal covers adapted to be secured to said terminals, a support plate, said plate having openings therein and being adapted to be held in fixed relation to said battery by said terminal covers whereby said battery may be mounted externally of said distributing device.

9. In an electrostatic distributing device having a means for storing a particular type of material, a means for creating an air stream, means for introducing said material into said air stream, a nozzle for directing said air stream in a desired direction, a power supply for placing said nozzle at one electrical potential and a centrally disposed electrode mounted within said nozzle at the opposite polarity and said distributing device being adapted to be transported and operated by an operator, the improvement comprising in combination with said distributing device a battery, said battery having at least one terminal protruding therefrom, at least one terminal cap, said cap adapted to be releasably attached to said terminal, means to operatively connect said terminal to said power supply, a support plate having means for mounting the same on an operator, said plate having longitudinally aligned openings therein, said battery being mounted on said plate externally of said distributing device by passing said terminal through one of said openings and being held in fixed relation thereto by said cap whereby said battery may be mounted on and transported by said operator externally of said distributing device.

References Cited by the Examiner

UNITED STATES PATENTS

| 1,188,127 | 6/16 | Wright | 43—148 |
| 1,530,578 | 3/25 | Sessions | 43—148 |
| 1,854,475 | 3/32 | Littlefield. | |
| 1,964,945 | 7/34 | Helgason et al. | 174—52 X |
| 2,659,841 | 11/53 | Hampe. | |
| 2,767,359 | 10/56 | Larsen et al. | 317—3 |
| 2,784,351 | 9/53 | Renner | 317—3 |
| 3,141,259 | 7/64 | Winters | 43—148 |

FOREIGN PATENTS

| 934,683 | 1/48 | France. |

OTHER REFERENCES

Applications of Electrostatic Charging to the Deposition of Insecticides and Fungicides on Plant Surfaces. Bowen et al., Agricultural Engineering, June 1952 Issue, pp. 348—350.

SAMUEL KOREN, *Primary Examiner.*

ABRAHAM G. STONE, FRANCIS R. CHAPPELL,
*Examiners.*